Feb. 9, 1943.  W. A. MELSOM  2,310,536
METHOD OF CONNECTING HOSE COUPLING COMPONENTS
Filed May 21, 1940
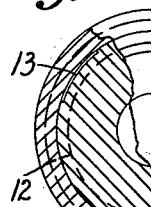
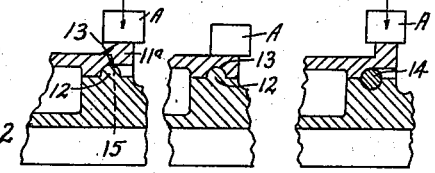
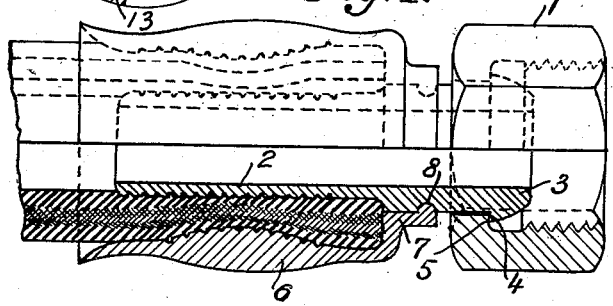
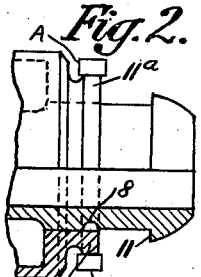
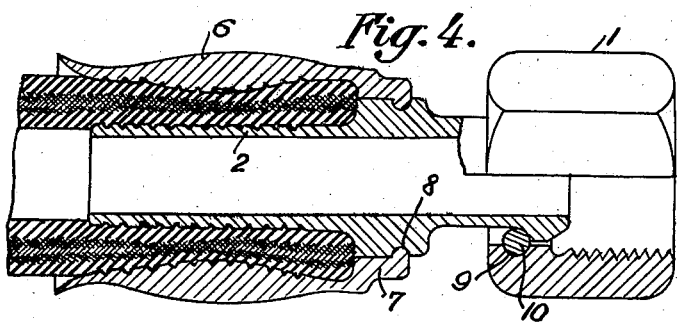
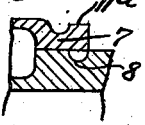
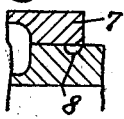
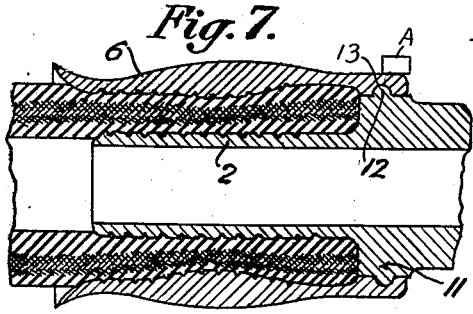
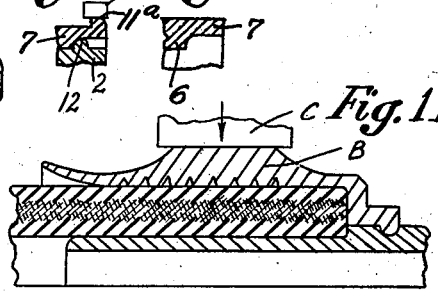
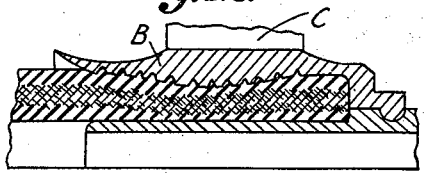
INVENTOR
Walter Arthur Melsom
BY Albert F. Nathan
ATTORNEY Patented Feb. 9, 1943

2,310,536

UNITED STATES PATENT OFFICE 2,310,536

METHOD OF CONNECTING HOSE COUPLING COMPONENTS

Walter Arthur Melsom, Willesden Junction, London, England, assignor to Bowden (Engineers) Limited, London, England, a British company Application May 21, 1940, Serial No. 336,368
In Great Britain April 11, 1940

3 Claims. (Cl. 29—148)

The present invention relates to improvements in the method of uniting flexible hose coupling components of the kind in which a contracted ferrule or sleeve of material suited to contraction such as brass, duralumin, low carbon steel, or phosphor bronze, hereinafter termed sleeve, clamps the hose onto an inner rigid tubular portion or insert which may be of the same material, hereinafter termed insert, couplings of this kind being more particularly intended for use with medium and high pressure hoses such as are employed for the conveyance of gases, liquids, semi-solids or viscous substances under pressure.

In such hose couplings as used in medium and high pressure flexible hoses, the end of the reinforced rubber or like hose is usually inserted into the sleeve up to an end wall thereof at the outer end of the coupling, and the insert is introduced into the bore of the hose, whereafter the sleeve is radially contracted upon the hose by appropriate swaging or contracting methods so as powerfully to grip it between the sleeve and insert.

Although the sleeve and insert of such couplings can be made in one piece and this is of advantage where it is possible simply and cheaply to machine the couplings out of the solid, considerations of space and design however frequently arise in which such machining of the couplings is either unduly expensive or impracticable, and it becomes necessary to make the sleeve and insert in two pieces. In such cases however it is advisable that the insert should be so secured to the sleeve that there shall be no likelihood of its being blown out of the hose by the end thrust exerted thereon by the internal working pressure in the hose.

The present invention aims to overcome these difficulties by a coupling in which a portion of the sleeve which extends beyond the hose end is radially contracted and thereby is caused frictionally to grip an insert which is separate from the sleeve, such parts being so shaped that as a result of such contraction they are axially interlocked. The portion of the hose which is arranged between the sleeve and the tubular insert is compressed and gripped between the insert and the sleeve, by radially contracting that surrounding part of the sleeve onto the hose. Proposals have been made to groove the insert and to lock a part of the sleeve with the groove and the main object of the present invention is to improve upon such connections when effected by radial contraction of the sleeve so as to obtain a strong grip of the sleeve on the hose and a positive interlock of the sleeve and insert. A further object is to provide the sleeve with additional metal where the hose grip and the interlock are to be produced. A further object is to provide a method whereby the operation of producing the interlock of sleeve and insert and the grip of the sleeve on the hose may be effected in any desired order and preferably so as to establish the interlock first. A further object is to use the insert as the junction member so that the joint between the sleeve and insert terminates in the open so that in the event of leakage through rupture of that part of the hose which lies within the sleeve, such leakage will generally demonstrate itself by fluid escaping through this joint.

The sleeve and insert may be held against relative rotation solely by frictional engagement between the parts and this often suffices, but if need be, the parts may be so shaped that they are circumferentially interlocked when the contracting operation has been completed.

The outer end of the insert may be enlarged to form a stop for the coupling nut and the contraction of the sleeve on to the insert effected after the nut has been positioned on the insert. Thus in one form of my invention I contract the sleeve onto a portion of the insert which is substantially smaller than the internal diameter of the nut thread, this portion of the insert being of a diameter equivalent to that of accepted standard type union nipples and smaller than the aperture in the nut and thus the insert accepts a standard coupling nut which has to be passed over the insert from the tail end thereof.

In another form of my invention I contract the sleeve onto a portion of the insert which is of larger diameter than the aperture in the nut, provision being made for so coupling the nut to the insert as to make this local enlargement of the insert possible without departing from the standard size nut. Such increase in diameter of the cooperating connecting portions of the sleeve and insert serves the purpose inter alia of increasing the torque arm opposing relative rotation of the sleeve and insert and of furnishing a larger anvil for the contracting operation.

It will be seen that the joint between the sleeve and insert according to my invention terminates in the open, and is not shrouded by the sleeve, as would generally be the case if the sleeve and not the insert were the part co-operating with the junction mechanism. This presents the advantage that in the event of leakage through rupture of that part of the hose which lies within the sleeve, such leakage will generally demonstrate itself by fluid escaping through this joint.

The invention can be carried into practical effect in divers ways according to the design which may be most suited to the parts to which the finished flexible hose assembly must connect, and three forms of coupling are illustrated in the accompanying drawing, in which:

Fig. 1 is an elevation half in section through the coupling in which the insert is shouldered to locate the coupling nut axially the parts being shown as they would appear after swaging.

Fig. 2 is a fragmentary view showing the shape of the end of the sleeve before swaging it onto the insert, and Fig. 3 is a fragmentary view of an alternative initial form of the end of the sleeve. Fig. 4 is a sectional view of a form of coupling combined with another construction of nut which allows the wall of the insert onto which the sleeve is swaged to be thickened and Figs. 5 and 6 are fragmentary views of two alternative constructions of the end of a sleeve suitable for use with such insert before being contracted. Fig. 7 is a sectional view of a variant form of the coupling shown in Fig. 4 and Fig. 8 is a fragmentary view of a portion of the sleeve before swaging, while Fig. 9 is a similar fragmentary view of an alternative construction of the sleeve before swaging. Fig. 10 shows the end of the sleeve contracted from the position shown in Fig. 2 to produce the interlock of the sleeve and insert and Fig. 11 shows the hose in position but not gripped. Fig. 12 shows the enlargment of the hose engaging part of the sleeve contracted onto the hose, both Figs. 11 and 12 being half longitudinal sections. Fig. 13 is a fragmentary view of the end of the sleeve and insert assembled for swaging where the parts are shaped to produce a circumferential interlock. Fig. 14 shows the sleeve portion contracted to produce such interlock and Fig. 15 is a transverse section on the line 15—15, Fig. 13, showing the original shape of the parts. Fig. 16 is a fragmentary section of the end of the sleeve where a separate interlock member is used.

The contracting dies are illustrated merely diagrammatically. In the form shown in Figs. 1–3 of the accompanying drawing, the insert 2 is provided with a collar 3 providing a shouldered stop face 4 which co-operates with the inner diametral wall 5 of the coupling nut 1 and in this case the nut has to be passed on to the insert before the latter is connected to the sleeve 6. The sleeve is formed with an axially aligned boss 7 of smaller diameter than the sleeve itself and an annular groove 8 is provided on the major shank diameter of the insert which is to be engaged by such boss. The parts are assembled and appropriately located one with respect to the other, for example by the swaging dies in the position shown in Fig. 2, and the boss is swaged down by the radially moving dies A onto the annular groove in the insert in such a way as substantially to fill the groove as shown in Fig. 10 and set up a powerful clamping action on the insert thus interlocking the insert and the sleeve against relative axial movement and frictionally securing the insert and the sleeve against relative rotational movement. The hose and interlocked sleeve and insert are then assembled, see Fig. 11, and the enlargement B on the hose engaging part of the sleeve is contracted by the radially moving dies C around the end of the hose so as to grip the hose between the sleeve and the insert. Fig. 12 shows the contraction when complete.

Where, as in Figs. 4 to 9, it is not necessary to pass the insert tail end first through the nut, but on the other hand it is possible to secure the nut to the insert by passing it over the outer end of the insert, the major shank diameter of the insert may be desirably enlarged in diameter where it engages the sleeve and the annular groove 7 provided in this enlarged portion. Provision has to be made to secure the nut to the insert and any of the methods described in my co-pending application Serial No. 377,813 will serve, the one illustrated in Fig. 4 being an example. Briefly, an annular passage 9 formed in part in the insert and in part in the nut when the parts are in position this passage is occupied by a ring of wire 10 or by a series of balls entered by way of an opening in the wall of the nut.

While I have referred to an annular groove it is to be understood that more than one groove may be used as desired and that the method may be reversed as depicted by Fig. 7 so that a rib 12 or projection, or ribs or projections, may be turned or otherwise provided on the insert and the sleeve portion radially contracted onto the insert, a counterpart groove 13 being formed as a result of this contraction which enables the two parts to interlock axially as well as to be made into an integral unit by the powerful grip between the parts which prevents any relative rotational movement between them. Fig. 8 shows the end of the sleeve and insert ready for contraction of the sleeve by dies A and Fig. 7 shows the contraction effected in the completed article. The order of contracting the sleeve on the insert and the sleeve on the hose may be as hereinbefore described with reference to Figs. 2 and 10 to 12.

In any of the forms described, additional metal can be provided on the external surface of the swaged portion of the sleeve for transferring sufficient metal to the inner surface thereof by gathering in or diminishing the diameter of such portion under the action of the swaging dies or contracting tools so as to cause the displaced metal to engage firmly with the groove in the insert. For example, in Figs. 2, 5 and 8, collars 11a are provided for this purpose. This local enlarging of the sleeve is however not essential and Figs. 3, 6 and 9 show how the external diameter of that portion of the sleeve which lies around and adjacent the groove or rib on the insert can be initially of uniform cylindricity externally.

It will be appreciated that, for constant overall diameters but varying inside diameters of hose, the sleeves may be constant in sizes, the only variations made being the shape and type of the inserts. Thus, in addition to providing an effective method of making the sleeve and insert components into one homogeneous whole, considerable manufacturing advantages are obtained by this method of construction, which enables standardised sleeves to be fitted irrespective of the shape of the insert ends.

Conversely for constant bores of flexible hose but having varying outside diameters, inserts may be similarly standardised with corresponding advantages.

I would have it understood that while I have described continuous annular grooves and ribs, interrupted grooves or ribs could be employed and if desired the grooves or ribs could be made a helix or a part of a helix of small pitch. In Figs. 13 to 15 the rib 12 on the insert is interrupted at 13 so that in contracting the enlargement 11a from the position shown in Fig. 13, the material flows onto the interruptions as shown in Fig. 14 and produces the circumferential interlock. For example, in lieu of forming an integral rib on the insert, a groove could be formed and the ring 14 (Fig. 16) inserted in the groove with a part of its diameter projecting outwards in the manner of the rib shown in Fig. 7 and the sleeve swaged onto the projecting portion of the ring. The ring could be split to facilitate assembling it into the grooves.

What I claim is:

1. The method of producing a flexible hose coupling component suitable for use with medium or high pressure hose comprising a circumferentially continuous sleeve, a separately formed insert adapted to cooperate with junction mechanism, and a flexible hose gripped between such sleeve and insert which consists in first forming said sleeve with an externally raised annular wall portion at one end and then forming the insert with a complementary formed annular cavity in the exterior surface, assembling the sleeve, insert, and hose end, contracting the portion of the sleeve with the annulus by radially moving means engaging the raised annulus forcing part of the metal in said raised end portion of the sleeve to flow radially inward and to fill the annular cavity in the insert with metal, the metal so displaced from the inner surface of the sleeve being replaced by the flow of the metal from said annular portion and thereby forming a substantially cylindrical exterior surface on said sleeve at the region of union, and while holding the parts in assembled relation with said radially moving means, contracting the sleeve by radial pressure around the hose to grip the hose firmly between the sleeve and the insert.

2. The method of producing a flexible hose coupling component suitable for use with pressure hose comprising a circumferentially continuous sleeve, a separately formed insert adapted to cooperate with junction mechanism, and a flexible hose gripped between such sleeve and insert which consists in forming the wall of said sleeve with an outwardly raised annular band and said insert with a complementary annular abutment wall, assembling the sleeve, hose end and insert, contracting the annular band of the sleeve by radially moving means engaging the exterior surface of said annular band so as to force the material of the wall of the sleeve in the plane of the said band to flow radially inward and to interlock with the said annular abutment on the sleeve, the material so displaced from the inner portion of the wall of the sleeve being replaced by the material in said annular band thereby to form a substantially cylindrical exterior surface on sleeve at the region of the interlock of the sleeve with the insert, and while holding the parts in assembled relation with said radially moving means, contracting the sleeve by radial pressure around the hose to grip the hose firmly between the sleeve and the insert.

3. The method of claim 2 including the step of interrupting the abutment wall to receive metal from the said annular band and in contracting the said band of the sleeve forcing the metal into the interruptions of the abutment wall.

WALTER ARTHUR MELSOM.